(12) United States Patent
Ogawa

(10) Patent No.: US 7,438,106 B2
(45) Date of Patent: Oct. 21, 2008

(54) PRODUCTION OF SHAPED RUBBER BODY

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 309 days.

(21) Appl. No.: 11/089,464

(22) Filed: Mar. 25, 2005

(65) Prior Publication Data

US 2005/0161163 A1 Jul. 28, 2005

Related U.S. Application Data

(62) Division of application No. 10/197,478, filed on Jul. 18, 2002, now Pat. No. 6,955,734.

(30) Foreign Application Priority Data

Jul. 25, 2001 (JP) ............................. 2001-224049

(51) Int. Cl.
B29D 30/16 (2006.01)
B29C 47/32 (2006.01)

(52) U.S. Cl. ........................ 156/397; 156/425

(58) Field of Classification Search .............. 156/397, 156/117, 130, 244.13, 425
See application file for complete search history.

(56) References Cited

U.S. PATENT DOCUMENTS

| RE25,349 E | * | 3/1963 | Hanson .................. 156/130 |
| 3,975,126 A | * | 8/1976 | Wireman et al. ............ 425/141 |
| 4,963,207 A | | 10/1990 | Laurent |
| 5,156,781 A | | 10/1992 | Böhm et al. |
| 6,372,070 B1 | | 4/2002 | Iizuka et al. |
| 6,723,194 B2 | | 4/2004 | Takaoka |
| 2001/0042586 A1 | | 11/2001 | Caretta et al. |
| 2001/0050134 A1 | | 12/2001 | Iizuka |

FOREIGN PATENT DOCUMENTS

| EP | 0 492 425 A1 | 7/1992 |
| EP | 0 968 814 A2 | 1/2000 |
| EP | 1 084 814 A1 | 3/2001 |
| JP | 2000-108222 A * | 4/2000 |
| WO | WO 03/101712 A1 | 12/2003 |

OTHER PUBLICATIONS

Derwent Abstract for US 4,963,207 with Patent Family; Oct. 16, 1990.*
XP-002209836; Walter Michaeli, ed., "Extrusion Dies," 1984, pp. 323-332.

* cited by examiner

Primary Examiner—Geoffrey L Knable
(74) Attorney, Agent, or Firm—Oliff & Berridge, PLC

(57) ABSTRACT

A shaped rubber body with improved uniformity in terms of weight and/or physical properties is produced by extruding a rubber strip by a positive displacement extruding system that includes, as seen from an upstream side of the rubber strip, a screw extruder unit, a gear pump unit and an extrusion head unit with an extrusion nozzle, which are connected in series with each other. The rubber strip is fed to a rotating support along a substantially straight passage extending from the screw extruder unit to the extrusion nozzle of the extrusion head unit, passed through a gap defined between a pair of pressure roll, and applied onto an outer surface of the support by one of the pressure rolls.

3 Claims, 3 Drawing Sheets

PRODUCTION OF SHAPED RUBBER BODY

This is a Divisional of application Ser. No. 10/197,478, filed on Jul. 18, 2002, and issued as U.S. Pat. No. 6,955,734. The entire disclosure of the prior application is hereby incorporated by reference herein in its entirety.

BACKGROUND OF THE INVENTION

1. Field of the Invention

The present invention relates to a method of, and an apparatus for producing a shaped rubber body, such as an unvulcanized tire or a tire constituent member, on a rotating support.

2. Description of the Related Art

There is known a method of producing shaped rubber body on a rotating support, wherein a rubber strip is extruded by a positive displacement extruding system and either directly or indirectly applied onto an outer peripheral surface of the support while it is rotated, as disclosed in U.S. Pat. No. 6,372,070 B1, for example. The positive displacement extruding system includes, as seen from an upstream side of the rubber strip, a screw extruder unit, a gear pump unit and an extrusion head unit with an extrusion nozzle, which are connected in series with each other. A pair of guide rollers is arranged between the extrusion nozzle and the support, to define a gap through which the rubber strip is passed so that one of the guide rolls guides the rubber strip and applies it onto the support. Such a method proved to be highly advantageous in that the rubber strip can be accurately and efficiently applied onto the support.

It would be highly desirable to further improve the above-mentioned known method in such a way as to improve uniformity of the shaped rubber body in terms of its weight and/or physical properties.

SUMMARY OF THE INVENTION

It is an object of the present invention to provide improved method and apparatus for producing shaped rubber body on a rotating support, which make it possible to produce a shaped rubber body having an improved uniformity in terms of weight and/or physical properties.

The present invention is based on a novel recognition obtained after comprehensive research and experiments, that the uniformity of the shaped rubber body formed on a rotating support can be significantly enhanced by minimizing the pressure loss and shearing friction of the rubber strip as it is extruded from a positive displacement extruding system. In other words, it has been found that when the rubber strip is fed to the rotating support along a sharply bent passage at a location between the downstream side of the screw extruder unit and the gear pump unit, on one hand, and the upstream side of the extrusion head unit, on the other hand, as taught by U.S. Pat. No. 6,372,070 B1, depending upon various parameters including viscoelastic properties of the rubber material, there may be instances wherein the rubber strip is subjected to noticeable pressure loss and/or shearing friction so as to degrade the uniformity of the shaped rubber body in terms of its weight and/or physical properties.

According to one aspect of the present invention, there is provided a method for producing a shaped rubber body by extruding a rubber strip by a positive displacement extruding system that includes, as seen from an upstream side of the rubber strip, a screw extruder unit, a gear pump unit and an extrusion head unit with an extrusion nozzle, which are connected in series with each other, said method comprising the step of:

feeding the rubber strip to a rotating support, along a passage extending from said screw extruder unit to said extrusion nozzle of the extrusion head unit, wherein said passage is a substantially straight passage; and applying the rubber strip directly or indirectly onto an outer peripheral surface of the support.

According to another aspect of the present invention, there is provided an apparatus for producing a shaped rubber body on a rotating support, comprising:

a positive displacement extruding system for extruding a rubber strip, said system including, as seen from an upstream side of the rubber strip, a screw extruder unit, a gear pump unit and an extrusion head unit with an extrusion nozzle, which are connected in series with each other so as to define a substantially straight passage extending from said screw extruder unit to said extrusion nozzle of the extrusion head unit, along which the rubber strip is fed to the rotating support; and a pair of guide rolls that are arranged between the extrusion nozzle of the extrusion head unit and the support, said guide rolls defining a gap therebetween through which said rubber strip is passed, one of said guide rolls applying the rubber strip onto the outer peripheral surface of the support.

With the above-mentioned method and/or apparatus according to the present invention, the rubber strip is fed to a rotating support, along a substantially straight passage extending from the screw extruder unit to the extrusion nozzle of the extrusion head unit. As a result, it is possible to minimize the pressure loss and/or shearing friction of the rubber strip as it is extruded from a positive displacement extruding system, thereby allowing significant improvement in uniformity of the shaped rubber body formed on a rotating support.

The support for forming the shaped rubber body thereon may be a rigid core having an outer peripheral shape that corresponds to an inner peripheral shape of the tire, a belt/tread drum for forming a belt/tread band, or a tire building drum having a center portion that can be radially expanded or retracted. Thus, when the support is a rigid core, for example, the rubber strip member is applied to form a carcass ply that extends across the tread portion of the tire, or to form a reinforcement belt layer on a carcass layer that has been prepared on the support in advance. When, on the other hand, the support is a tire building drum, the rubber strip member is applied with the drum center portion expanded radially outwards for a shaping of the carcass ply or the like.

It is preferred that the screw extruder unit, the gear pump unit, the extrusion head unit and the guide rolls form an assembly that can be moved integrally, so as to apply the rubber strip over a desired region of the outer peripheral surface of the support.

In this instance, the assembly may be selectively moved by (i) a first drive means for moving the assembly in a direction of the passage for the rubber strip; and/or (ii) a second drive means for moving the assembly in a direction of a rotational axis of the support; and/or (iii) a third drive means for moving the assembly about a swivel axis, which extends perpendicular to the direction of the passage for the rubber strip and also to the direction of the rotational axis of the support, and which passes a point of contact between the outer peripheral surface of the support and the above-mentioned one of the guide rolls.

BRIEF DESCRIPTION OF THE DRAWINGS

The present invention will be described below in further detail, with reference to the preferred embodiment shown in the accompanying drawings.

DETAILED DESCRIPTION OF THE PREFERRED EMBODIMENT

Figure 1:
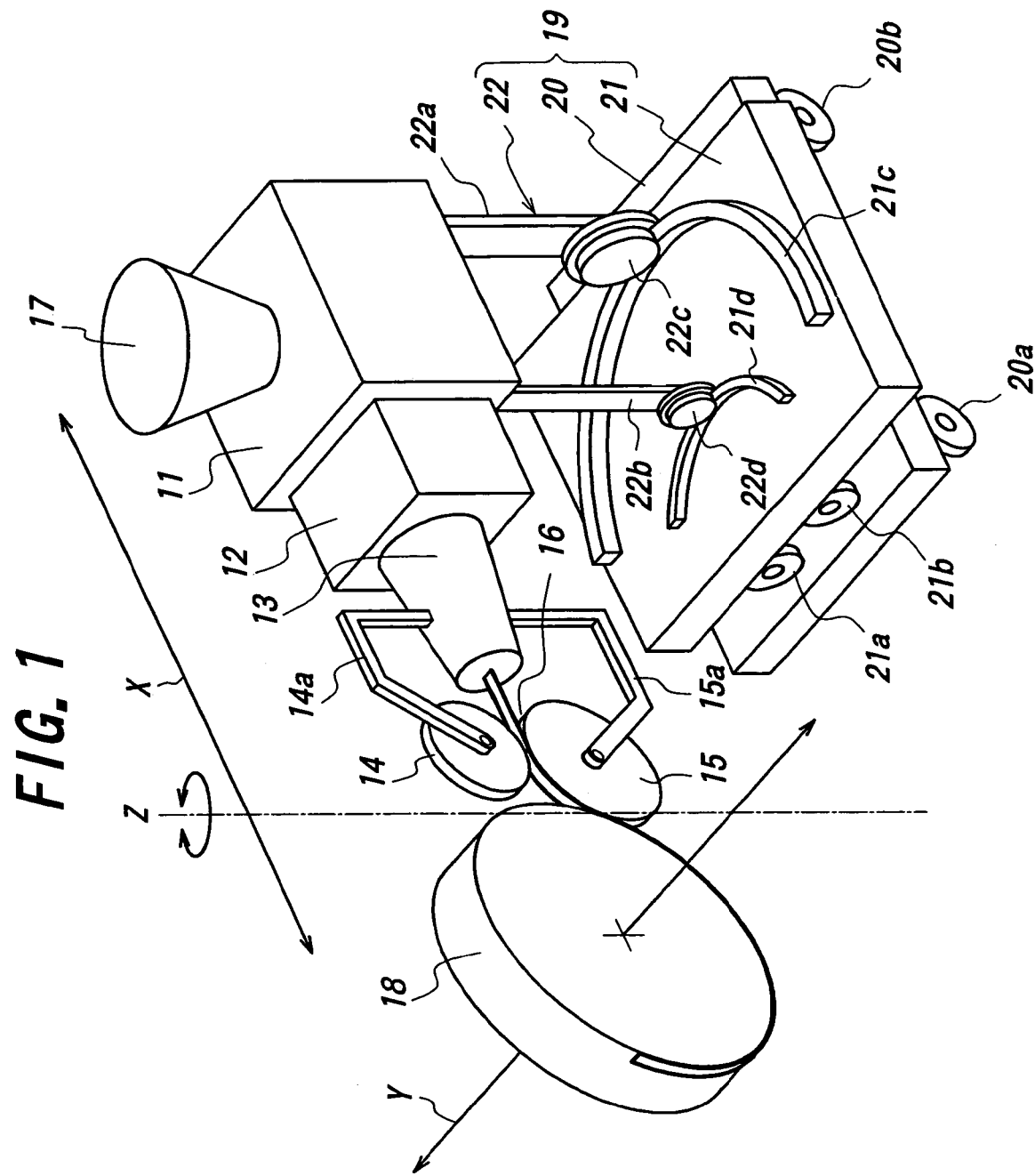
FIG. 1 is a schematic perspective view showing a preferred embodiment of an apparatus for carrying out the method according to the present invention, for producing a shaped rubber body on a rotating support.
Figure 2:
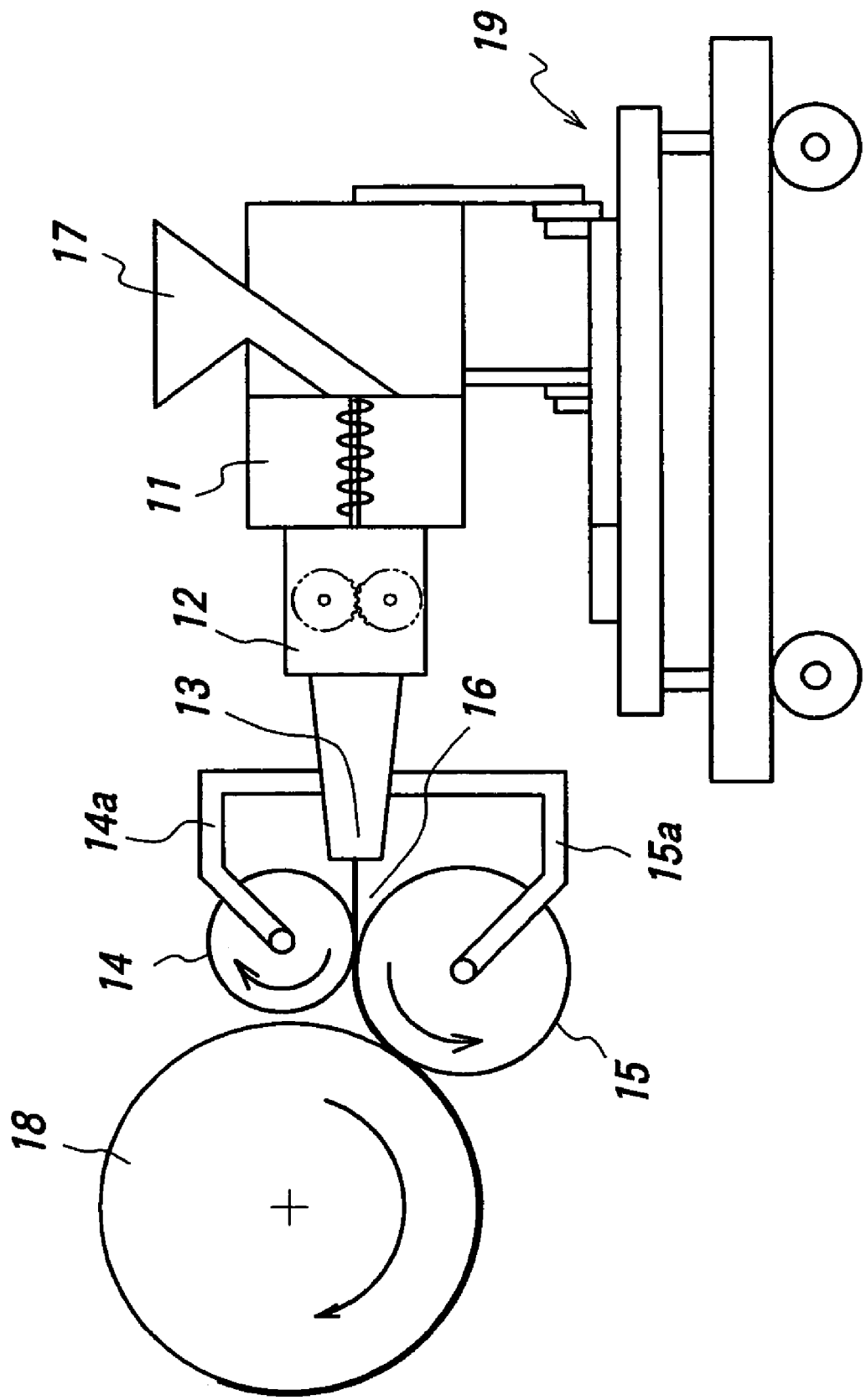
FIG. 2 is a schematic front view of the apparatus shown in FIG. 1.

Referring now to FIGS. 1 and 2, there is shown an apparatus for carrying out the method according to the present invention. The apparatus includes a positive displacement extrusion system for extruding an unvulcanized rubber material having a predetermined constant cross-section, with a predetermined constant volume. The extrusion system is comprised of a screw extruder unit 11; a gear pump unit 12 coupled to the discharge end of the extruder unit 11, an extrusion head unit 13 coupled to the discharge side of the gear pump unit 12 and including an extrusion nozzle, as well as a pair of pressure rolls 14 and 15 opposed to each other defining a narrow gap 16 therebetween. The pressure rolls 14, 15 are supported by brackets 14a, 15a, respectively, which are fixedly secured to the extrusion head unit 13. The extruder unit 11 is provided with an inlet in the form of a hopper 17, for supplying the raw rubber material to be extruded as a rubber strip. The extruded rubber strip is subjected to final shaping by a roller die that is comprised of the pressure rolls 14, 15, and is then applied onto the outer peripheral surface of a rotating support 18 having a horizontal center axis. To this end, in the illustrated embodiment, the pressure roll 15 is resiliently urged against the support 18 so as to maintain contact therewith. The extrusion system that may be suitably applied in the present invention is generally disclosed in U.S. Pat. No. 6,372,070 B1, the disclosure of which is herein incorporated by reference.

According to the present invention, the extruder unit 11, the gear pump unit 12, the extrusion head unit 13 and the pressure rolls 14, 15 included in the positive displacement extrusion system are linearly arranged to form an integrated assembly having a substantially straight horizontal passage along which the rubber material is fed toward the support 18. The passage for the rubber material extends in a direction X that is typically perpendicular to the axial direction Y of the support 18.

The positive displacement extrusion system explained above is mounted on a carriage 19 that is movable so as to be position the extrusion system relative to a desired region of the support 18, where the rubber strip is to be applied. The carriage 19 includes a lower base plate 20 and an upper base plate 21, which are stacked one above the other, as well as a leg structure 22 that is arranged between the upper base plate 21 and the extruder unit 11. The lower base plate 20 is provided with driving wheels 20a, 20b, which are movable along respective guide tracks (not shown) on a working floor. The guide tracks for the lower base plate 20 extend in parallel with the direction X of the straight passage for the rubber material. The lower base plate 20 has an upper surface that is similarly provided with guide tracks (not shown) for the upper base plate 21. The guide tracks for the upper base plate 21 extend in parallel with the axial direction Y of the support 18. The upper base plate 21 is provided with driving wheels 21a, 21b, which are movable along the respective guide tracks on the lower base member 21. The upper base plate 20 has an upper surface that is provided with arcuate guide tracks 21c, 21d for the support 22. The leg structure 22 includes a plurality of vertical legs 22a, 22b having upper ends that are fixedly connected to the extruder unit 11, as well as driving wheels 22c, 22d provided at the lower end of the legs 22a, 22b. The driving wheels 22c, 22d of the leg structure 22 are engaged with, and guided by the guide tracks 21c, 21d of the upper base plate 21, respectively. The guide tracks 21c, 21d for the driving wheels 22c, 22d of the leg structure 22 have their center of curvature on a vertical swivel axis Z, which extends perpendicular to the direction X of the passage for the rubber strip and also to the direction Y of the rotational axis of the support, and which passes a point of contact between the outer peripheral surface of the support 18 and the guide roll 15.

The driving wheels 20a, 20b of the lower base plate 20 constitute a first drive unit for moving the positive displacement extrusion system in the direction X of the passage for the rubber material, toward and away from the support 18. The driving wheels 21a, 21b of the upper base plate 21 constitute a second drive unit for moving the positive displacement extrusion system in the axial direction Y of the support 18, so as to cover the entire width of the support 18. Finally, the driving wheels 22c, 22d of the leg structure 22 constitute a third drive unit for moving the positive displacement extrusion system about a vertical swivel axis Z so as to accommodate three dimensional curvature of the support 18, if any. It may be assumed that these driving wheels 20a, 20b, 21a, 21b, 22c, 22d are each provided with a servomotor that is electrically connected to, and controlled by a suitable controller, not shown.

In operation of the above-mentioned apparatus, a predetermined kind of rubber material is charged from the hopper 17 into the extruder unit 11. The extruder unit 11 includes driving screws that are rotated so as to apply a shearing force to the rubber material and thereby plasticize the rubber material, while continuously extruding the rubber material toward the gear pump unit 12. The rubber material is passed through the gear pump unit 12 in the plasticized state and continuously discharged to the extrusion head unit 13 at a predetermined constant volume. The rubber material fed into the extrusion head unit 13 is passed therethrough and extruded from the nozzle unit 14 as a strip rubber. The extruded strip rubber is passed through the gap 16 between the pressure rolls 14, 15, and applied onto the outer peripheral surface of the rotating support 18 by the pressure roll 15 that is in contact with the support 18.

During such application of the extruded rubber strip onto the outer peripheral surface of the rotating support 18, the driving wheels 20a, 20b of the lower base plate 20 as the first drive unit, the driving wheels 21a, 21b of the upper base plate 21 as the second drive unit and/or the driving wheels 22c, 22d of the leg structure 22 as the third drive unit are selectively operated to move the integrated assembly of the extruder unit 11, gear pump unit 12 and the extrusion head unit 13, in the direction X of the passage for the rubber material, in the axial direction Y of the support 18, and/or about the vertical swivel axis Z, depending upon the shape of the outer peripheral surface of the support 18.

Figure 3:
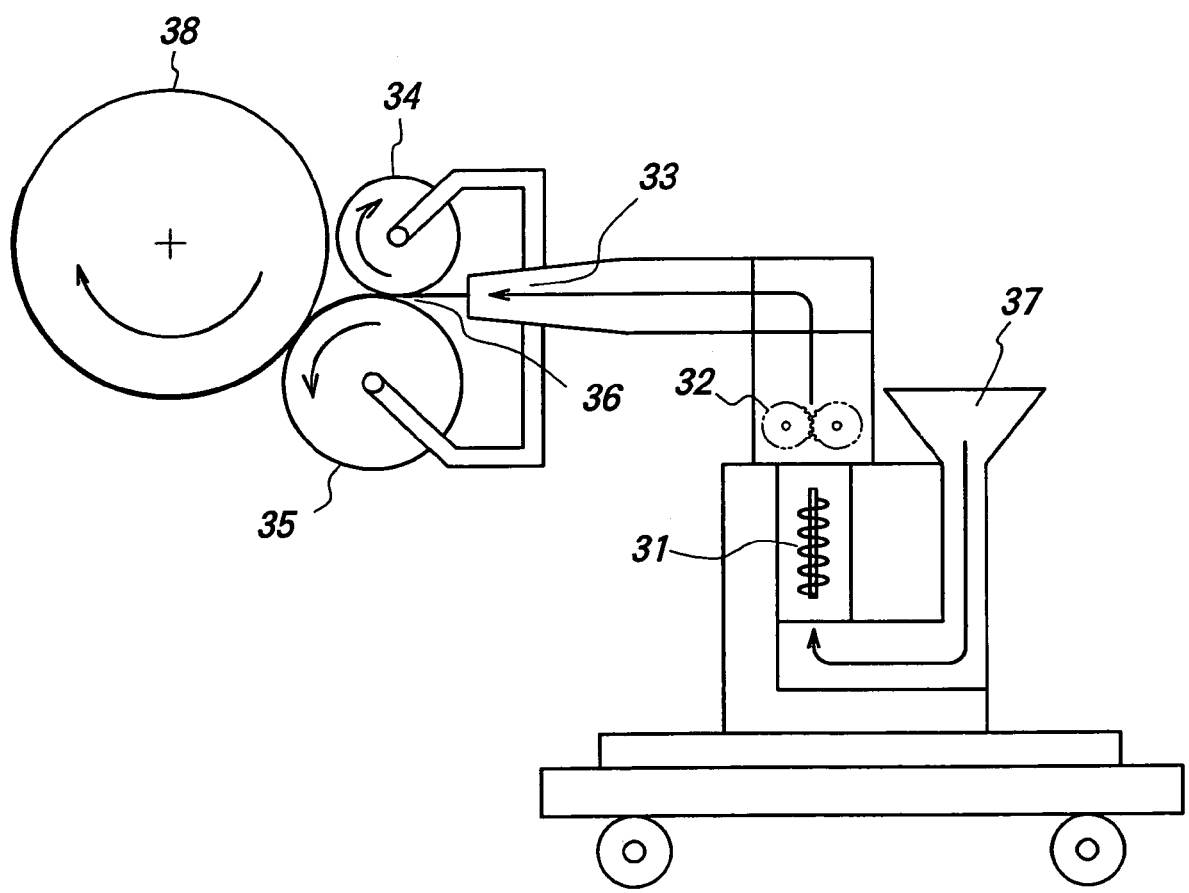
FIG. 3 is a schematic view similar to FIG. 2, but showing a conventional arrangement of the extruding system.

Conventionally, as shown in FIG. 3, the positive displacement extrusion system is arranged such that the rubber material is fed through an extruder unit 31 and a gear pump unit 32 along a first passage portion that extends vertically, and further through an extrusion head unit 33 and a gap 36 between pressure rolls 34,35 along a second passage portion that extends horizontally. Since the second passage portion is bent substantially at right angles with reference to the first passage portion, there may be instances wherein the rubber strip is subjected to noticeable pressure loss and/or shearing friction so as to degrade the uniformity of the shaped rubber body in terms of weight and/or physical properties. Incidentally, reference numerals 37 and 38 in FIG. 3 denote a hopper and a rotating support, respectively.

In contrast, according to the present invention, the positive displacement extrusion system is featured by a linear arrangement of the extruder unit 11, the gear pump unit 12, the extrusion head unit 13 and the pressure rolls 14, 15 so as to form a substantially straight horizontal passage for the rubber material. It is therefore possible to minimize the pressure loss and/or shearing friction of the rubber strip as it is extruded from a positive displacement extruding system, thereby allowing significant improvement in uniformity of the shaped rubber body. Moreover, the linear arrangement of the positive displacement extrusion system according to the present invention makes it possible to minimize the height and weight of the entire system, thereby allowing space saving and cost reduction.

It will be appreciated from the foregoing description that the present invention provides improved method and apparatus for producing shaped rubber body on a rotating support, which make it possible to produce the shaped rubber body having an improved uniformity.

While the present invention has been described above with reference to a preferred embodiment shown in the drawings, it is needless to say that various changes and/or modifications may be made without departing from the scope of the invention as defined by the appended claims.

Thus, for example, the pressure roll 15 may be maintained in contact with the rotatable support 18 such that a line segment connecting the center points of the pressure roll 15 and the support 18 is horizontal and intersects with the vertical swivel axis Z at right angles.

The invention claimed is:

1. An apparatus for producing a shaped rubber body on a rotating support, comprising:
    a rotating support;
    a positive displacement extruding system for extruding a rubber strip, said system including, as seen from an upstream side of the rubber strip, a screw extruder unit, a gear pump unit and an extrusion head unit with an extrusion nozzle, which are connected in series with each other so as to define a substantially straight passage extending from said screw extruder unit to said extrusion nozzle of the extrusion head unit, along which the rubber strip is fed to the rotating support;
    a pair of guide rolls that are arranged between the extrusion nozzle of the extrusion head unit and the support, said guide rolls defining a gap therebetween through which said rubber strip is passed, one of said guide rolls applying the rubber strip onto the outer peripheral surface of the support;
    said screw extruder unit, said gear pump unit, said extrusion head unit and said guide rolls forming an assembly; and
    a first drive means for moving said assembly about a swivel axis, which extends perpendicular to a direction of the substantially straight passage for the rubber strip and also to a direction of the rotational axis of the support, and which passes a point of contact between the outer peripheral surface of the support and said one of the guide rolls;
    wherein said assembly can be moved integrally, so as to apply the rubber strip over a desired region of said outer peripheral surface of the support.

2. The apparatus according to claim 1, wherein said support is a rigid core of which the outer peripheral surface has a shape that corresponds to a shape of an inner peripheral surface of the shaped rubber material.

3. The apparatus according to claim 1, further comprising:
    a second drive means for moving said assembly in the direction of said passage for the rubber strip; and
    a third drive means for moving said assembly in the direction of a rotational axis of said support.

* * * * *